United States Patent [19]

Glass et al.

[11] 4,415,593

[45] Nov. 15, 1983

[54] CHEWING GUM BASE

[75] Inventors: Michael Glass, Flushing; Edwin R. Koch, Garden City; Vincent Corsello, Albertson, all of N.Y.

[73] Assignee: Warner Lambert Company, Morris Plains, N.J.

[21] Appl. No.: 372,599

[22] Filed: Apr. 28, 1982

[51] Int. Cl.³ .............................................. A23G 3/30
[52] U.S. Cl. ............................................ 426/4; 426/6
[58] Field of Search ................................... 426/3, 4, 6

[56] References Cited

U.S. PATENT DOCUMENTS

| 1,040,285 | 10/1912 | Darling | 426/6 |
|---|---|---|---|
| 2,286,712 | 6/1942 | Borglin | 426/6 |
| 3,974,293 | 8/1976 | Witzel | 426/4 |
| 3,984,574 | 10/1976 | Comollo | 426/4 |
| 4,202,906 | 5/1980 | Ogawa et al. | 426/6 |
| 4,224,345 | 9/1980 | Tezuka et al. | 426/3 |
| 4,254,148 | 3/1981 | Ogawa et al. | 426/3 |

*Primary Examiner*—Jeanette M. Hunter
*Attorney, Agent, or Firm*—Daniel A. Scola, Jr.; Gary M. Nath

[57] ABSTRACT

The present invention relates to chewing gum compositions whose elastomeric component in the chewing gum base employed in formulating said chewing gum compositions comprises as an essential ingredient a polyisoprene obtained from naturally-occurring guayule rubber. (Parthenium Argnetatum)

5 Claims, No Drawings

CHEWING GUM BASE

BACKGROUND

Chewing gum usually consists of the combination of a chewing gum base with various fillers, flavoring agents and sweeteners which are added to impart desirable texture and taste to the gum. In the early history of this confectionery product, the chewing gum base employed was generally a naturally-occurring gum such as chicle to which were added other materials including gutta and various resins of natural origin. More recently, for a variety of economic reasons, including cost and dependable supply, the chewing gum bases employed have been modified to include varying amounts of materials of synthetic origin. Copolymers of styrene-butadiene and isobutylene-isoprene and polymers such as polyethylene, polyisobutylene and polyvinyl acetate have been employed. However, specially purified grades of synthetic polymers are required for preparing chewing gum base. Synthetic rubber manufacturers have had a dwindling interest in preparing food grade polymers since they represent only a very small fraction of the total synthetic polymers (rubber) production. While many alternate (natural) materials have been suggested from time to time, few, if any, meet all of the criteria which practical experience has shown are required to yield an acceptable chewing gum base, especially if a non-stick or non-tack character is desired. Hence, only very low levels of the naturally occurring rubbers could be utilized in nonstick formulations.

THE PRIOR ART

Various proposals have been made for the production of chewing gum base having non-stick qualities. In U.S. Pat. No. 2,761,782 the use of a dimethylpolysiloxane in chewing gum is said to produce a product which does not stick to dentures. A gum base which contains hydroxypropyl starch acetate as an essential ingredient yields a non-stick product according to U.S. Pat. No. 3,883,666. The use of titanium dioxide in combination with hydrophilic detackifiers and other slip agents is described in U.S. Pat. No. 3,974,293.

In U.S. Pat. No. 3,984,574 various combinations of synthetic elastomers with hydrogenated vegetable oils, mineral adjuvants, polyvinyl acetate and fatty acids including their mono- and di-glycerides are described as producing non-stick chewing gum base compositions. The desired non-stick quality is obtained in U.S. Pat. No. 4,208,432 by providing an anti-stick agent comprising fine particles of lactose or calcium carbonate coated with certain glycerides of higher molecular weight saturated fatty acids. Similar compositions are disclosed in U.S. Pat. Nos. 4,242,090 and 4,241,091 where a slip agent is employed which may be alphacellulose, bran, texturized vegetable protein, and various fruit pulps, among others.

A method for producing a chewing gum base having satisfactory characteristics by combining rubber, resin and an inhibiting agent soluble in the resin but not in the rubber at a temperature below the liquifying temperature of the resin is described in U.S. Pat. No. 1,977,059. The resin may be obtained from guayule and the inhibitive agent may be a wax such as carnauba. Substantially pure natural rubber as crepe sheet or sprayed latex is recommended. However, this composition does not appear to have any non-stick qualities as they are understood today where the composition will not stick to artificial dentures, bridges and the like.

DESCRIPTION OF THE INVENTION

We have now found that an excellent chewing gum base having non-stick qualities may be obtained from readily available ingredients by combining naturally-occurring guayule rubber in higher percentages than other naturally occurring rubbers with optimum amounts of a number of modifying agents which include a suitable oleagenous plasticizer, a mineral filler, a vinyl polymer, together with emulsifiers as well as a suitable solvent or solvents for the elastomeric materials present.

In formulating the chewing gum base of the present invention the guayule rubber is initially subjected to high shear mixing, after which the elastomer solvent may be added thereto in stepwise fashion under continued high shear. Subsequently, the oleagenous plasticizer components may be added in similar stepwise fashion with continued high shear, after which the remaining ingredients of the chewing gum base composition may be added sequentially. Thus, the emulsifier, non-toxic vinyl polymer and the mineral adjuvants are then added, and may, in one embodiment, be added in a sequence determined by the decreasing order of their viscosity.

Naturally, the foregoing details of the present method are presented for purposes of illustration. Modification in the foregoing parameters may be made within the scope of the present invention, and the invention should not be limited to the parameters set forth above.

Preferably, the chewing gum base will contain from 8 to 30% by weight of guayule rubber, 9 to 40% by weight of oleagenous plasticizer, 10 to 15% by weight of mineral filler, 16 to 32% by weight of vinyl polymer 0.5 to 10% by weight of emulsifier and 2.5 to 13% by weight of elastomer solvent.

Typical oleagenous plasticizers useful in formulating the novel chewing gum base of this invention include fully or partially hydrogenated vegetable oils, such as soybean oil, cottonseed oil, corn oil, peanut oil, and palm oil, as well as hydrogenated or partially hydrogenated animal fats such as tallow or lard. Also, cocoa butter and waxes such as natural waxes, petroleum waxes including the polyethylene waxes, paraffin waxes, and microcrystalline waxes with melting points higher than 80° C., may be utilized individually or in mixtures with each other.

The mineral fillers which are suitable for use are preferably inert and non-toxic. While finely divided calcium carbonate is preferred, others which may be employed are magnesium carbonate, alumina, talc, tricalcium phosphate and the like; as well as mixtures thereof. The present chewing gum base composition may include one or more fatty acids, which, when utilized, may be selected from stearic acid, palmitic acid, oleic acid and the like; and mixtures thereof.

Suitable non-toxic vinyl polymers are those conventionally used in chewing gum base such as polyvinyl acetate or partially hydrolyzed polyvinyl acetate, i.e. polyvinyl alcohol, and mixtures thereof. Generally, the most useful vinyl polymer which is employed is polyvinyl acetate since it is readily available in non-toxic inert form and in a degree of polymerization having physical characteristics and masticatory qualities which are acceptable in a chewing gum base. The non-toxic vinyl polymer utilized in the present invention may vary in molecular weight, and may preferably possess a molecular weight ranging from about 3,000 to about 94,000 including molecular weights on the order of 10,000 to 40,000, as well as 50,000 to 75,000.

The elastomer solvents useful in formulating the improved chewing gum base and whose use ensures that a uniform and homogenous blend is produced include the terpene resins such as polymers of -pinene or -pinene; rosin derivatives including hydrogenated or partially hydrogenated derivatives, such as the glycerol ester of polymerized rosin, alcohol esters of rosin such as the glycerol ester of hydrogenated rosin, the pentaerythritol ester of hydrogenated rosin, the pentaerythritol ester of partially hydrogenated rosin, the glyceryl esters of partially hydrogenated rosin, the glyceryl ester of rosin and mixtures thereof. Preferably, the glyceryl ester of partially hydrogenated wood rosin may be utilized, and may be present in amounts by weight of the composition ranging from about 2.5% to about 13%, and more preferably, from about 2.5% to about 5% by weight. This ester of wood rosin may be used alone or in admixture with one or more of the other resins in the amounts indicated.

The emulsifiers may be selected from lecithin, glyceryl monostearate, fatty acid monoglycerides, diglycerides and triglycerides, glyceryl triacetate, propylene glycol monostearate, and mixtures thereof.

In order further to illustrate this invention, the following Examples are given:

EXAMPLE 1

Guayule Rubber—25%
Hydrogenated Vegetable Oil—26%
Glyceryl Monostearate—6%
Calcium Carbonate—11%
Polyvinyl Acetate—16%
Gyceryl Ester of Partially Hydrogenated Wood Rosin—16%

The foregoing ingredients were blended in accordance with the present method by the initial shear mixing of the guayule rubber, followed by stepwise additions of the elastomer solvent and the addition of the remaining ingredients in metered fashion thereto.

In a similar fashion, the following formulation was prepared and its specific ingredients, and respective amounts expressed in weight percent are set forth below.

EXAMPLE 2

Guayule Rubber—8%
Hydrogenated Vegetable Oil—8%
Calcium Carbonate—30%
Polyvinyl Acetate—7%
Glyceryl Monostearate—8%
Glyceryl Ester of Partially Hydrogenated Wood Rosin—5%
Paraffin Wax—7%
Microcrystalline Wax—12%

The present chewing gum base compositions may be formulated into a variety of chewing gum products utilizing standard procedures and equipment. Thus, a chewing gum may be prepared by combining additional ingredients, such as sweeteners, flavorings, softeners, fillers, colorants and the like.

The gum base may vary in amount from about 15 to about 40% by weight of the final chewing gum, and preferably from about 20 to abut 30% by weight.

In addition to the ingredients listed above, plasticizers or softeners such as lanolin, propylene glycol, glycerol and the like and mixtures of these, may be optionally incorporated within the present gum base composition to achieve desired texture and consistency.

The present compositions may include mineral fillers, as already mentioned.

Additionally, thickeners may be employed herein alone or in conjunction with other softeners, and may include methyl cellulose, alginates, carrageenan, xanthan gum, gelatin, carob, tragacanth, locust bean, and carboxymethyl cellulose.

The chewing gum also may include a sweetener, which, in the instance of sugar sweetened gum, comprises sugar, including sucrose, glucose (corn syrup), dextrose, invert sugar, fructose, and mixtures thereof. In the instance where a sugarless gum is prepared, the sweetener comprises a sugar substitute, including saccharin and its various salts such as the sodium or calcium salts, cyclamic acid and its various salts such as the sodium salt, the dipeptide sweeteners such as aspartame; dihydrochalcone; glycyrrhizin; *Stevia rebaudiana* (Stevioside); and sugar alcohols such as sorbitol, sorbitol syrup, mannitol, xylitol, and the like. Also, the nonfermentable sugar substitute (hydrogenated starch hydrolysate) described in U.S. Pat. No. Re. 26,959, may be utilized, as well as the synthetic sweetener 3,4-dihydro-6-methyl-1,2,3-oxathiazin-4-one-2,2-dioxide, including its potassium, sodium and calcium salts, all described in German Pat. No. 2,001,017.7. Any of the foregoing sweeteners may be present alone or in combination with each other, within the scope of the present invention.

Useful flavors include the essential oils or synthetic flavors or mixtures thereof. Flavors include artificial and synthetic fruit flavors, cinnamon, spearmint, peppermint, birch, anise and the like, with natural fruit flavors derived from essence of fruits such as apple, pear, peach, strawberry, apricot, orange, watermelon, banana and the like. Generally, the flavors account for up to about 1% by weight of the total composition.

Additional materials may be included in the present chewing gum composition, such as corn syrup, sugar alcohols, such as sorbitol, mannitol and xylitol, as well as materials such as hydrolyzed cereal solids, which may be provided as bulking agents, as well as sweeteners.

The present chewing gums may be prepared in stick shape and cube shape, as well as in the center-filled conformation. The techniques for the preparation of chewing gums in these configurations are known in the art, and do not, per se, form a part of the present invention.

We claim:

1. A chewing gum base for use in producing chewing gum having improved non-stick chewing qualities comprising a natural polyisoprene rubber, inorganic fillers, plasticizers, non-toxic vinyl polymer, emulsifying agents and solvents for the rubber components wherein the improvement comprises the use of a polyisoprene rubber obtained from the guayule shrub.

2. The chewing gum base of claim 1 wherein the natural polyisoprene rubber is present in the amount of about 8% to about 30% by weight of the gum base.

3. The chewing gum base of claim 2 wherein the following ingredients are expressed in % by weight of the gum base:
plasticizer: about 9% to about 40%
inorganic filler: about 10% to about 15%
vinyl polymer: about 16% to about 32%
emulsifying agent: about 0.5% to about 10%
rubber solvent: about 2.5% to about 13%

4. The chewing gum base of claim 3 wherein the plasticizer is hydrogenated vegetable oil.

5. The chewing gum base of claim 3 wherein the plasticizer is polyvinyl acetate.

* * * * *